March 22, 1960
W. S. WELLS
2,929,974
SYNCHRONIZING CONTACTOR APPARATUS
Filed July 30, 1956
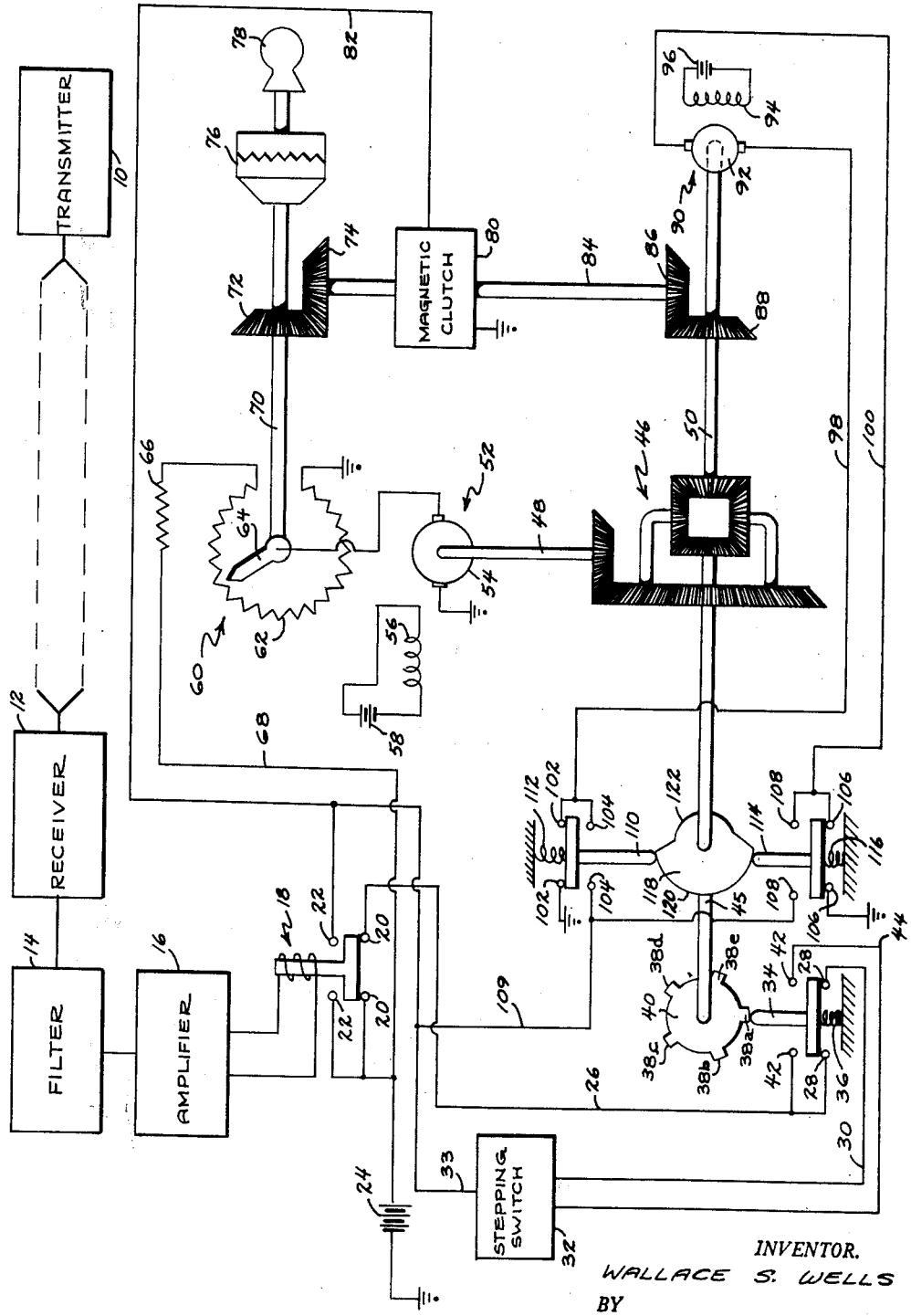
INVENTOR.
WALLACE S. WELLS
BY
Stuart R. Peterson
ATTORNEY.

United States Patent Office 2,929,974
Patented Mar. 22, 1960

2,929,974
SYNCHRONIZING CONTACTOR APPARATUS

Wallace S. Wells, St. Paul, Minn., assignor to General Mills, Inc., a corporation of Delaware Application July 30, 1956, Serial No. 600,775

7 Claims. (Cl. 318—46)

This invention relates generally to telemetering systems and pertains more particularly to apparatus for properly synchronizing the receiver of such a system with its transmitter.

To illustrate one application in which the invention may be employed, it may be explained that in carrying out radiosonde operations a single radio transmitter is utilized which sends out various meteorological data to a ground based receiver. To send these signals which are in the form of pulses having various repetition rates indicative of the information being transmitted, a clock-driven rotary contactor switch borne aloft by the balloon is employed for programming the various information to be transmitted. However, since the transmitted information is to be picked up by the ground based receiver, it is necessary in the exemplified situation to synchronize the corresponding rotary switch located on the ground with the switch carried by the balloon in order to sequentially process the received informational data. Therefore the transmitter periodically sends out a series of reference pulses which are received on the ground and by suitable filtering means these particular pulses are used in establishing a reference position for the switching equipment associated with the receiver. It is in this type of system that the apparatus forming the subject matter of the instant invention will find especial utility although its usefulness is not necessarily restricted to this specific environment.

Accordingly, one object of the invention is to provide synchronizing apparatus for a telemetering system, the apparatus being of such character that sequentially produced signals from a single transmitter will be received in the same order as sent so that such signal will be properly recognized on the receiving end for appropriate processing of the intelligence contained in said signals.

Another object of the invention is to provide synchronizing contactor apparatus that will be quite accurate in its operation so that the information received will be programmed in a substantially precise correspondence with the transmitted information.

Another object of the invetnion is to provide apparatus of the above character which is very fast in its corrective operation, the greater the deviation from a true reference point, the more rapid the correction or "zeroing" rate.

A further object of the invention is to provide synchronizing contactor apparatus which requires relatively little power for its opeartion, thereby enhancing its use at remote sites where only battery power is available.

A still further object of the invention is to provide apparatus of this type which will be rugged, relatively inexpensive to manufacture and quite easy to maintain.

Other objects will be in part obvious, and in part pointed out more in detail hereinafter.

The invention accordingly consists in the features of construction, combination of elements and arrangement of parts which wil be exemplified in the construction hereafter set forth and the scope of the application which will be indicated in the appended claims.

In the drawing, the single figure presented is a diagrammatic representation of a telemetering system incorporating the teachings of the instant invention.

Referring now in detail to the drawing, it will be observed that a transmitter 10 is depicted which in radiosonde operations would be carried aloft by the balloon and would send various meterological information to a ground based receiver 12. As an example of the information which may be desired, it can be pointed out that this information may include temperature, relative humidity, as well as other desired information including, of course, the reference signal with which we are primarily concerned at this time. The receiver 12 is associated with a filter network designated by the numeral 14, this filter excluding those pulse frequencies or repetition rates which are not of the preselected value. While any number of reference frequencies or rates may be selected, it may be assumed for the sake of discussion that this reference pulse rate is 240 pulses per second, the filter then excluding all pulse rates below this reference pulse repetition rate. In this regard the pulse frequencies below 240 p.p.s. would be utilized in conveying the meterological information whereas the 240 p.p.s. (or higher) would be restricted only to the reference positioning phase of the operation. From the filter 14 the received reference signals are delivered to an amplifier 16 having in its output circuitry a relay bearing the numeral 18. As can be discerned from the drawing, the relay 18 in its de-energized condition closes a pair of contacts 20 and in its energized condition closes a pair of contacts 22. More will be said presently concerning these particular contacts.

It will be observed that a source of power in the form of a battery 24 is provided. One conductive path that current from this source 24 may traverse is through the normally closed contacts 20 via a conductor 26 to a pair of contacts 28. By way of a conductor 30 the current is led from the contacts 28 (when closed) to one of a plurality of "stepping" contacts in circuit with the actuating coil of a stepping switch 32. Inasmuch as the specific construction of the stepping switch 32 is unimportant to a practicing of the invention, its details need not be described or depicted. However, as is conventional in such switch construction, the switch 32 is equipped with "homing" contacts as well as the above-alluded to "stepping" contacts. The "homing" contacts are instrumental in causing the wiper arm of the switch 32 to seek a particular or reference position, there being a conductor 33 leading to the "homing" contacts from the normally open contacts 22 which of course become closed when the relay 18 is energized, as it will be upon receipt of the appropriate reference pulses. Stated somewhat differently, whenever the relay contacts 22 are closed, the switch 32 will automatically be stepped to its reference position. As can be seen from the drawing, the contacts 28 can be bridged or closed by a plunger 34 biased upwardly by a coil spring 36. However, the biasing action of the coil spring 36 is readily overcome by any one of a plurality of radially projecting lobes 38a, b, c, d, and e carried by a rotatable cam 40. These lobes 38a, b, c, d, and e form intervening notches, any one of which notches will permit the plunger 34 to move upwardly to open the contacts 28 and to then close a pair of contacts 42. It will be noted that one of these contacts 42 is connected directly to the conductor 26 and that the other is connected to a conductor 44 leading to alternate "stepping" contacts belonging to the stepping switch 32. Thus when the plunger 34 is urged downwardly, the contacts 28 are closed and "step" the wiper arm of the switch 32 from one stepping contact to the next adjacent contact. When the plunger is moved upwardly under the influence of the spring 36, said next adjacent stepping contact is then instrumental in moving the wiper arm to the following contact and so on.

Considering now the manner in which the cam 40 itself is rotated in order to accomplish the above-described stepping operation, it will be noted that the cam is mounted on the end of a shaft 45, this shaft being what may be termed an output shaft driven by a differential mechanism denoted generally by the numeral 46. The differential 46 is coupled to a pair of input shafts 48 and 50. The input shaft 48 is driven by means of an electric motor 52 having an armature 54 and a field winding 56. The field winding 56 receives its energization from a source 58, whereas the armature 54 is energized in a controlled manner by a potentiometer 60 comprised of a resistance 62 and a rotatable wiper arm 64. The resistance 62 is in series with a fixed resistor 66 which in turn is connected to the main source of power 24 by a conductor 68.

The wiper arm 64 is rotated by way of a shaft 70 carrying thereon a beveled gear 72 which is in mesh with another beveled gear 74. The shaft 70 also carries a manually engageable and disengageable clutch 76, there being an actuating knob 78 by way of which the clutch 76 may be actuated. Normally, however, the shaft 70 is rotated at intervals through the beveled gears 72 and 74 by a magnetic clutch 80 which is energized via a conductor 82 in series with the contacts 22 whenever the relay 18 closes these contacts. Leading into the magnetic clutch is a shaft 84 having a beveled gear 86 thereon which meshes with another beveled gear 88 carried on the input shaft 50.

The input shaft 50 is driven by an electric motor 90 which is energized in a manner presently to be described. However, it is to be noted at this time that the motor has an armature 29 and a field winding 94, the latter being connected in circuit with a source of power 96. The armature 92 of the motor 90 is in circuit with a pair of conductors 98 and 100. The conductor 98 leads to a pair of normally closed contacts 104 and a pair of normally open contacts 102 leading to ground, whereas the conductor 100 leads to a pair of normally closed contacts 108 and a pair of normally open contacts 106 which are grounded. The contacts 104, 108 are connected in circuit with the earlier mentioned relay contacts 22 by a conductor 109. As can be seen from the drawing, the contacts 104 which are normally closed are rendered so by a plunger 110 biased downwardly by a coil spring 112. Similarly, the contacts 108 are maintained closed by reason of a second plunger 114 biased upwardly by a coil spring 116. However, provision is made for overcoming the biasing action associated with the two plungers 110 and 114, this taking the form of another cam labelled 118. It is to be noted that the cam 118 is profiled so that it has a segmental periphery 120 which is of a greater radius than a dwell portion 22. The greater radius portion 120 extends slightly more than 180° of the cam's circumference so that in one rotative position of the cam 118 both of the plungers 110 and 114 will be actuated to overcome the force applied by their respective springs 112 and 116 to bridge or close the contacts 102 and 106, respectively. This particular position corresponds to the reference position of the cam 40 inasmuch as the two cams 40 and 118 are angularly oriented on the shaft 45 so that the lobe 38a will be lowermost when both of the plungers 110 and 114 are causing their associated contacts 102 and 106 to be closed or bridged.

It may be pointed out at this time that when the sets of contacts 102 and 106 are both closed the motor 90 has its armature 92 deenergized for it can only receive energization from the source 24 via the contacts 22 when these contacts 22 and either of the sets of contacts 104 or 108 are closed by way of which a circuit is completed through the motor 90. Of course, it is only when the relay 18 is energized, as it will be when the appropriate reference signal is received from the transmitter 10, that the contacts 22 will be closed.

Considering a typical operational sequence, it may be first explained that, in the illustrated situation, there is no need for any correction because the reference lobe 38a is properly located so that the stepping switch will have already been actuated to its reference position. However, supposing that the reference lobe 38a is displaced in one rotative direction or the other from its pictured position and assuming more specifically for the sake of discussion that the cams 40 and 118 are being rotated in a counterclockwise direction and that the reference lobe 38a has been moved only to the position now taken by the lobe 38b when a reference signal is received, the cam 40 then needs to be speeded up. When this situation exists, it can be readily understood that the plunger 114 (the cam 118 being rotatable in unison with the cam 40) is permitted to move upwardly under the influence of its spring 116, thereby closing the contacts 108 and at the same time opening the contacts 106. When this situation prevails and the contacts 22 of relay 18 are closed, as will be the case if a reference signal is then being received, there is an electrical path provided to the motor 90 via the conductor 109, contacts 108, conductor 100, from the motor 90 through the conductor 98, and the contacts 102, the contacts 102 leading to ground to complete the circuit. Thus the motor 90 becomes energized and through the now engaged clutch 80, drives wiper arm 64 of the potentiometer 60 so as to increase the energization of the motor 52. Up to this point, the motor 52 has been rotating at some speed, for when the system is in operation, this motor operates continuously, but under the conditions we have assumed this speed has not been rapid enough. The two motors 52 and 90 then act in concert to drive the differential 46 so as to rotate the shaft 45 much faster in a direction, that is counter-clockwise under the assumed set of circumstances, so that high portion 120 of the cam 118 will be moved to the reference position in which it has actually been pictured. In this way the reference lobe 38a is quickly advanced to a lowermost position for the two cams 40 and 118 are mechanically connected so that they must move in unison. When the plunger 114 opens the contacts 108 the motor 90 immediately stops even though the relay 18 might still be in an energized condition. While the motor 90 is rotating, though, not only will the differential 46 be driven in a manner to rotate the output shaft 45 into the reference position shown, but as pointed out above, the energization of the motor 52 is also increased. This increase in energization, which increases the speed of motor 52, occurs by way of the bevel gears 88, 86, the magnetic clutch 80, the bevel gears 74, 72 and the wiper arm 64 that is thereby mechanically actuated, the arm being moved in a rotative direction to decrease the effect of the resistance 62 and thus supply power to the armature 54 of the motor 52 at a greater potential than before the motor 90 became operative.

When the motor 90 stops, as it will do either when the cams 40 and 118 have been returned to their reference position during this "zeroing" in period or when the reference pulses are no longer being transmitted, the wiper arm 64 will remain in the position into which it has been moved during the referencing period and will remain in this particular position throughout the rest of the cycle in which the actual informational data is being received. If it should prove that the advancement ultimately causes too great an increase in the speed of the motor 52, when the next referencing or "zeroing" period corresponding to such ultimate condition occurs, the reference lobe 38a will then, under these assumed conditions, be farther toward the right, i.e., rotated counter-clockwise past the position in which it has been actually pictured. This will permit the cam 118 to allow the plunger 110 to move onto the portion 122 with the consequence that the contacts 102 are opened and the contacts 104 are closed instead, thereby reversing the direction of the motor 90 from that previously experienced when the shaft 45 had been turning too slowly. Providing a reverse rotation of the motor operates the shaft 45 through the medium of the differential 46 to rotate the cam 40 to a position where the lobe 38a is lowermost, as depicted, and which is its proper reference position. At the same time, under the assumed circumstances, the wiper arm 64 is rotated so as to decrease the energization of the armature 56 of the motor 52 to slow it down.

From the foregoing, it will be discerned that an arbitrary zero point has been provided consisting of having the lobe 38a in its lowermost or six o'clock position and that this position is always achieved during a "zeroing in" or referencing period. By reason of the "homing" wafers within the stepping switch 32, the stepping switch is likewise brought to its zero position, being then ready for receipt of the transmitted informational data which is supplied via a frequency discriminator (not shown). Also, it will be recognized that a rate correction factor is introduced whenever the cam 40 is brought to its reference position from an incorrect position, for the motor 90 modifies the energization of the motor 52 in a manner to effect this desired corrective action. While the motor 90 is largely responsible for bringing the cam 40 to its reference position at a very fast rate, it can be appreciated that the modified energization of the motor 52 will help to preserve the synchronism as far as this cycle plus successive cycles are concerned. Should there be a drift in speed of the airborne rotary contactor then of course subsequent correction will be needed which will occur automatically in the manner hereinbefore described, whether it be a speeding up or a slowing down of the shaft 45.

Stated somewhat differently, each time a reference signal is received the relay 18 will close contacts 22 and the stepping switch 32 will be stepped to its "home" position. This of course means that the airborne rotary switch has reached a similar position, for otherwise a reference signal would not have been transmitted. Unfortunately the positions of the cams 40 and 118 may not agree with what has taken place. Consequently the ensuing stepping of the stepping switch 32 as caused by the lobes 38 on cam 40 will not be in a proper time relation with the rotation of the airborne rotary contactor. However, by making a prompt adjustment of the cams 40 and 118, depending upon whether there has been a lagging or leading, the cam 40 is for all intents and purposes synchronized with the airborne switch due to the sending of reference signal. Possibly the airborne switch may rotate slightly faster during its next revolution, thereby causing the cams 40 and 118 to lag, but when the next reference signal is received a further correction will be made. The magnetic clutch 80 is energized only during receipt of a reference signal.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which as a matter of language might be said to fall therebetween.

What is claimed is:

1. Synchronizing contactor apparatus comprising a differential mechanism provided with a pair of input shafts and an output shaft, a first electric motor connected to one of said input shafts, a second electric motor connected to the other input shaft, control means driven only by said first motor, said control means controlling the speed of said second motor, a first switch for causing said first motor to rotate in one direction, a second switch for causing said first motor to rotate in a reverse direction, and means coupled to said output shaft for actuating both of said switches to de-energize said first motor in a preferred rotative position of said output shaft.

2. Synchronizing contactor apparatus comprising a differential mechanism provided with a pair of input shafts and an output shaft, a first electric motor connected to one of said input shafts, a second electric motor connected to the other input shaft, control means driven by said first motor, said control means controlling the speed of said second motor, a first cam coupled to said output shaft having a plurality of high and low portions, switch means actuated by said high and low portions as the first cam is rotated, a first switch for causing said first motor to rotate in one direction, a second switch for causing said first motor to rotate in a reversed direction, and a second cam also coupled to said output shaft having high and low portions for actuating said first and second switches, said second cam having a rotative position in which both of said switches are actuated to deenergize said first motor.

3. Synchronizing contactor apparatus comprising a differential mechanism provided with a pair of input shafts and an output shaft, a first electric motor connected to one of said input shafts, a second electric motor connected to the other input shaft, a potentiometer driven by said first motor, said potentiometer being electrically connected to said second motor for controlling the speed thereof, a first cam coupled to said output shaft having a reference portion, a first switch for causing said first motor to rotate in one direction, a second switch for causing said first motor to rotate in a reverse direction, and a second cam also coupled to said output shaft having portions for actuating said first and second switches in a direction to deenergize said first motor when said first cam has been rotated into a reference position.

4. Synchronizing contactor apparatus comprising a differential mechanism provided with a pair of input shafts and an output shaft, a first electric motor connected to one of said input shafts, a second electric motor connected to the other input shaft, a potentiometer driven by said first motor, said potentiometer being electrically connected to said second motor for controlling the speed thereof, a first cam coupled to said output shaft having high and low portions, means actuated by said high and low portions as the first cam is rotated, a first switch for causing said first motor to rotate in one direction, a second switch for causing said first motor to rotate in a reverse direction, and a second cam also coupled to said output shaft having high and low portions for actuating said first and second switches, said second cam having a rotative position in which both of said switches are actuated to deenergize said first motor.

5. Synchronizing apparatus in accordance with claim 4 in which the high portion of said second cam extends over slightly more than half of the periphery of said second cam to actuate both of said switches.

6. Synchronizing contactor apparatus comprising a differential mechanism provided with a pair of input shafts and an output shaft, a first electric motor connected to one of said input shafts, a second electric motor connected to the other input shaft, a potentiometer driven by said first motor, said potentiometer being electrically connected to said second motor for controlling the speed thereof, a first cam coupled to said output shaft having high and low portions, switch means actuated by said high and low portions as the first cam is rotated, a first switch for causing said first motor to rotate in one direction, a second switch for causing said first motor to rotate in a reverse direction, a second cam also coupled to said output shaft having means thereon for actuating said first and second switches, said second cam having a rotative position in which both of said switches are open, and circuit means for energizing said first motor via said first and second switches to cause said second cam to be moved into said rotative position to open both of said switches.

7. Synchronizing apparatus in accordance with claim 6 in which said circuit means is operable upon receipt of a synchronizing pulse to cause said first motor to be operated in a direction via one of said first and second switches to move said second cam into said rotative position to open both of said switches.

References Cited in the file of this patent

UNITED STATES PATENTS

| | | |
|---|---|---|
| 2,436,582 | Lear | Feb. 24, 1948 |
| 2,439,065 | Stewart | Apr. 6, 1948 |
| 2,466,804 | Giffen et al. | Apr. 12, 1949 |
| 2,506,269 | Finch | May 2, 1950 |
| 2,685,348 | Borden | Aug. 3, 1954 |